United States Patent [19]

Hino et al.

[11] Patent Number: 4,742,535

[45] Date of Patent: May 3, 1988

[54] INVERTER TYPE X-RAY APPARATUS

[75] Inventors: Hirofumi Hino, Noda; Hideki Uemura, Kashiwa; Kazuo Kaneko, Omiya; Takanobu Hatakeyama, Ryugasaki; Kazuo Yamamoto, Ibaraki, all of Japan

[73] Assignee: Hitachi Medical Corporation, Tokyo, Japan

[21] Appl. No.: 812,845

[22] Filed: Dec. 23, 1985

[30] Foreign Application Priority Data

Dec. 28, 1984 [JP] Japan ................................ 59-279737

[51] Int. Cl.⁴ ........................ H02M 3/335; H05G 1/20

[52] U.S. Cl. .................................... 378/105; 378/111; 378/112; 378/109; 378/110; 363/17; 363/25; 323/222

[58] Field of Search ............... 378/105, 111, 106, 107, 378/109, 112, 110; 363/17, 25, 128; 323/222

[56] References Cited

U.S. PATENT DOCUMENTS 4,247,888 1/1981 Angquist ............................ 363/128

4,533,986 8/1985 Jones .................................. 323/222

*Primary Examiner*—Carolyn E. Fields

*Assistant Examiner*—Joseph A. Hynds

*Attorney, Agent, or Firm*—Antonelli, Terry & Wands

[57] ABSTRACT

Disclosed is an inverter type X-ray apparatus comprising a DC-DC converter for converting a DC voltage into a different DC voltage, an inverter for inverting an output voltage of the DC-DC converter into an AC voltage, a high voltage transformer for transforming an output voltage of the inverter into a higher voltage, a rectifier for converting an AC output voltage of the transformer into a DC voltage, and an X-ray tube to which an output voltage of the rectifier is applied. In the apparatus, the DC-DC converter includes a reactor, a switching element and a capacitor which are interconnected so that the DC-DC converter can generate an output voltage higher or lower than an input voltage.

16 Claims, 6 Drawing Sheets

INVERTER TYPE X-RAY APPARATUS

BACKGROUND OF THE INVENTION

This invention relates to an inverter type X-ray apparatus, and more particularly to a circuit for decreasing inverter current in such an apparatus.

In a conventional X-ray apparatus connected to a commercial AC power source, it is a common practice that a regulated voltage obtained by selectively changing the position of slidable brushes disposed on the secondary sides of a voltage regulating transformer or by selectively changing over output taps disposed on the secondary side of a voltage regulating transformer is raised by a high voltage transformer, and such a high voltage is applied to an X-ray tube after being rectified.

On the other hand, with the recent remarkable progress of power semiconductor elements, an inverter type X-ray apparatus using such semiconductor elements for the purpose of power control has been developed and proposed recently. The inverter type X-ray apparatus developed recently is advantageous over the conventional X-ray apparatus in that its power control response is very quick as compared with that of the conventional X-ray apparatus using a voltage regulating transformer as described above, because of the use of semiconductor elements for attaining the power control. Therefore, the inverter type X-ray apparatus is advantageous in that a tube voltage can also be easily regulated during X-ray exposure, so that the tube voltage can be accurately set at any desired level suitable for X-ray exposure.

A prior art, inverter type X-ray apparatus has a construction as, for example, disclosed in Japanese Unexamined Patent Publication No. 54-118787 (1979). The construction of part of the prior art X-ray apparatus cited above will be described with reference to FIG. 8.

Referring to FIG. 8, a full-wave rectifier circuit 1A connected to a chopper circuit 4A to provide a predetermined DC voltage. This chopper circuit 4A is composed of a chopping transistor **4*b*, a smoothing reactor 4*a*, a free-wheel diode 4*c* and a smoothing capacitor 4*d*. The connection is such that, in the off-period of the chopping transistor 4*b*, current from the smoothing reactor 4*a* flows through a loop which is traced from the smoothing reactor 4*a*→ smoothing capacitor 4*d*→ freewheel diode 4*c* to the smoothing reactor 4*a*. An inverter 5A inverts the DC output voltage of the smoothing capacitor 4*d* into a corresponding AC voltage. This inverter 5 is composed of transistors 5*a* and 5*b*. In the inverter 5A, the transistors 5*a* and 5*b* are alternately turned on to apply an AC voltage to a high voltage transformer 6A. The voltage raised by the high voltage transformer 6 is applied to an X-ray tube 8 after being rectified in a full-wave rectifier circuit 7**.

As shown in FIG. 8, the output voltage of the full-wave rectifier circuit 1A is applied to the chopper circuit 4A normally after being rectified by the smoothing circuit composed of a reactor 2 and a condenser 3, however, such smoothing circuit is omitted in the embodiment of Japanese Patent Unexamined Publication No. 54-118787.

In the prior art, inverter type X-ray apparatus having a construction as described above, the chopper circuit 4A is used for regulating the tube voltage. There is the following relation between an input voltage $V_R$ and an output voltage $V_C$ of the chopper circuit 4A:

$$V_C = \frac{Ton}{Tc} V_R \quad (1)$$

where fc is equal to $1/T_C$ is the operating frequency of the chopper circuit 4, Tc is the period of the frequency, and Ton is the on-duration of the transistor **4*b***. Therefore, a predetermined output voltage can be obtained as desired by changing the value of Ton. Hereinafter, the ratio Ton/Tc will be called a duty ratio.

However, since there is the relation Ton<Tc, the output voltage $V_C$ is necessarily lower than the input voltage $V_R$ in the illustrated arrangement, as apparent from the expression (1). Therefore, in order to provide a predetermined tube voltage, the winding ratio (referred to hereinafter as a step-up ratio) of the high voltage transformer 6A must be selected to be sufficiently large. On the other hand, in order to supply a predetermined output current from the high voltage transformer 6A, an input current, which is as large as a value obtained by multiplying the tube current by the winding ratio of the high voltage transformer 6A, must be supplied to the primary winding of the high voltage transformer 6A. Thus, the larger the winding ratio of the high voltage transformer 6A, the larger is the input current that must be supplied to the high voltage transformer 6A for providing the predetermined output current, that is, the current flowing through the transistors **5*a* to 5*d* of the inverter 5A**.

Suppose, for example, that the X-ray apparatus is connected to a commercial AC power source of single-phase 200 [V]. The value of the smoothed output voltage of the full-wave rectifier circuit 1A is generally an average of the values of the AC input voltage applied under a loaded condition. Therefore, the terminal voltage $V_R$ of the smoothing capacitor 3 under the loaded condition is given by $$V_R = 200\ [V] \times \frac{2\sqrt{2}}{\pi} = 180\ [V] \quad (2)$$

Suppose that the maximum value of the duty ratio (=Ton/Tc) of the chopper circuit 4A is 0.9. Then, the output voltage $V_C$ of the chopper circuit 4 is expressed as follows:

$$V_C = 0.9 \times V_R = 162\ [V] \quad (3)$$

In order to apply a tube voltage of 150 [kV] to the X-ray tube 8 when the output voltage $V_C$ of the chopper circuit 4 is 162 [V], the winding ratio K of the high voltage transformer 6A is given by the following expression:

$$K = \frac{150 \times 10^3}{162} = 926 \quad (4)$$

The output of X-ray apparatus of this type has been greatly increased up to now. In order to supply a tube current of 1000 [mA] to the X-ray tube 8, the value of an input current $I_{T1}$ that must be supplied to the high voltage transformer 6A is calculated as follows:

$$I_{T1} = 1000\ [mA] \times K = 926\ [A] \quad (5)$$

Therefore, the transistors **5*a* and 5*b* incorporated in the inverter 5A are required to be capable of controlling a large current as large as about 1,000 [A]. Semiconductor elements capable of controlling such a large current are quite expensive. In addition, the resistance Rl of the wiring connected to the inverter 5 and to the inputs of high voltage transformer 6A** increases a power loss Wl which is expressed as follows:

$$Wl = Rl \times I_{T1}2 \quad (6)$$

Thus, the prior art, inverter type X-ray apparatus has had the problem that an increase in the input current $I_{T1}$ supplied to the high voltage transformer 6A results in a corresponding increase in the power loss Wl due to the wiring resistance Rl on the input sides of the inverter 5A and high voltage transformer 6A and also in a corresponding reduction of the operating efficiency of the X-ray apparatus.

SUMMARY OF THE INVENTION

It is an object of the present invention to provide an inverter type X-ray apparatus in which a circuit for decreasing the inverter current is provided so that the current capacity of the semiconductor switching elements of the inverter and the power loss due to the wiring resistance can both be reduced and the voltage applied to the X-ray tube can be controlled over a wide range.

The above and other objects, features and advantages of the present invention will be apparent from the following detailed description of preferred embodiments thereof taken in conjunction with the accompanying drawings.

According to a feature of the present invention, the chopper circuit 4 incorporated in the prior art, inverter type X-ray apparatus shown in FIG. 8 is replaced by a DC-DC conversion circuit (referred to hereinafter as a DC-DC converter) which can generate an output voltage higher than its input voltage and which has a voltage control function. By the use of such a DC-DC converter, a high input voltage is applied to the inverter and the inverter current is decreased so that the current capacity of the semiconductor switching elements of the inverter and the wiring loss can both be reduced.

Preferred embodiments of the present invention when applied to an inverter type X-ray apparatus will be described in detail with reference to the drawings.

Throughout the drawings, the same reference numerals are used to designate the same functional parts to dispense with repetition of the same description.

DESCRIPTION OF THE PREFERRED EMBODIMENTS

Figure 3:
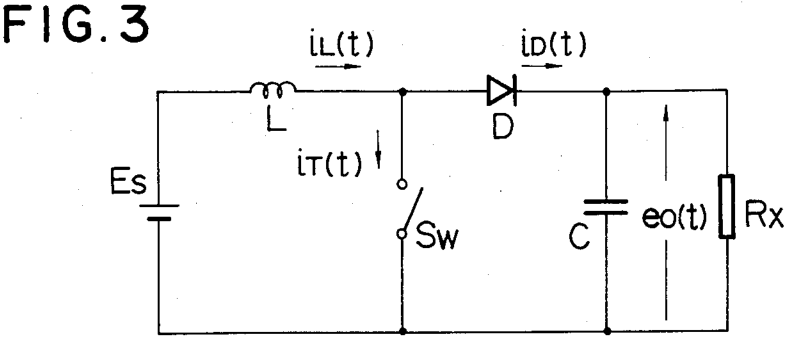
FIGS. 3 and 4 are an equivalent circuit diagram and a waveform diagram respectively for illustrating the principle of the first embodiment of the apparatus of the present invention.
Figure 4:
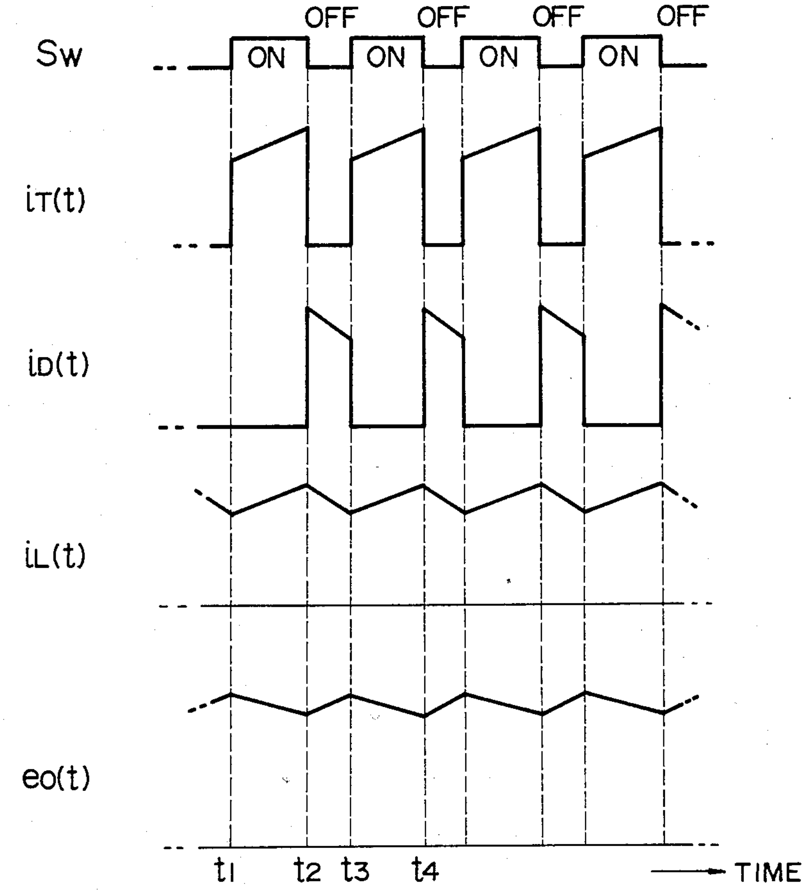

FIG. 3 is an equivalent circuit diagram for illustrating the principle of a DC-DC converter employed in a first embodiment of the inverter type X-ray apparatus of the present invention, and FIG. 4 is a waveform diagram for illustrating the operation of the equivalent circuit shown in FIG. 3.

As shown in FIG. 3, the equivalent circuit of the DC-DC converter employed in the first embodiment has such a structure that an inductance L, a diode D and a load Rx are connected in series with a DC power source $E_S$, and a boosting switch Sw and a capacitor C are connected in parallel with the DC power source Es and a load Rx respectively.

In FIG. 4, voltage and current waveforms appearing at various parts of the equivalent circuit shown in FIG. 3 are designated by Sw, $i_T(t)$, $i_D(t)$, $i_L(t)$ and eo(t). More precisely, a control signal Sw having a waveform as shown is applied to control on-off of the switch Sw, a current $i_T(t)$ having a waveform as shown flows through the switch Sw at time t, a current $i_D(t)$ having a waveform as shown flows through the diode D at time t, a current $i_L(t)$ having a waveform as shown flows through the inductance L at time t, and a voltage eo(t) having a waveform as shown appears across the capacitor C at time t. Symbols $t_1$, $t_2$, $t_3$, $t_4$, . . . designate times.

The principle of the DC-DC converter employed in the first embodiment will be described with reference to FIGS. 3 and 4.

Referring to FIGS. 3 and 4, when the boosting switch Sw is turned on at time $t_1$, current from the DC power source Es flows through a current path which is traced from the DC power source Es→inductance L→switch Sw to the DC power source Es, thereby increasing the current $i_L(t)$ flowing through the inductance L. On the other hand, the terminal voltage eo(t) of the capacitor C decreases since power is supplied to the load Rx by discharge of the capacitor C.

Then, when the switch Sw is turned off at time $t_2$, the current $i_T(t)$ flowing through the switch Sw is commutated to the diode D, and the current from the DC power source Es flows now through a current path which is traced from the DC power source Es→inductance L→diode D→capacitor C and load Rx to the DC power source Es. The capacitor C is charged by the energy of the inductance L and the DC power source Es so that the voltage of the capacitor C is higher than that of the DC power source.

Then, when the switch Sw is turned on again at time $t_3$, the current $i_D(t)$ flowing through the diode D is commutated to the switch Sw. The operation described above is repeated thereafter.

Therefore, when a boost-up DC-DC converter as shown in FIG. 3 is employed, an output voltage higher than an input voltage can be provided.

Figure 1:
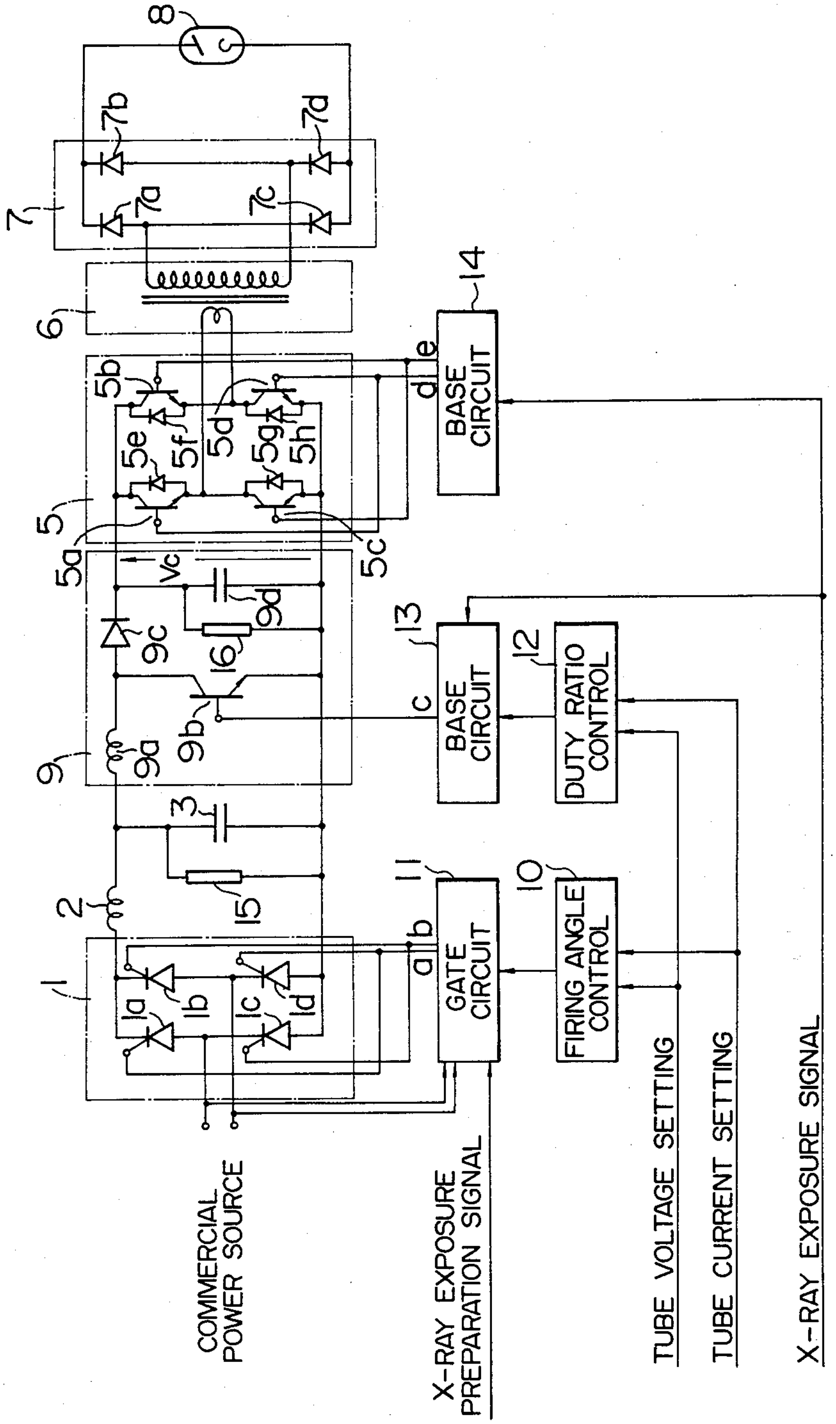
FIG. 1 is a circuit diagram showing schematically the structure of a first embodiment of the inverter type X-ray apparatus of the present invention.
Figure 2:
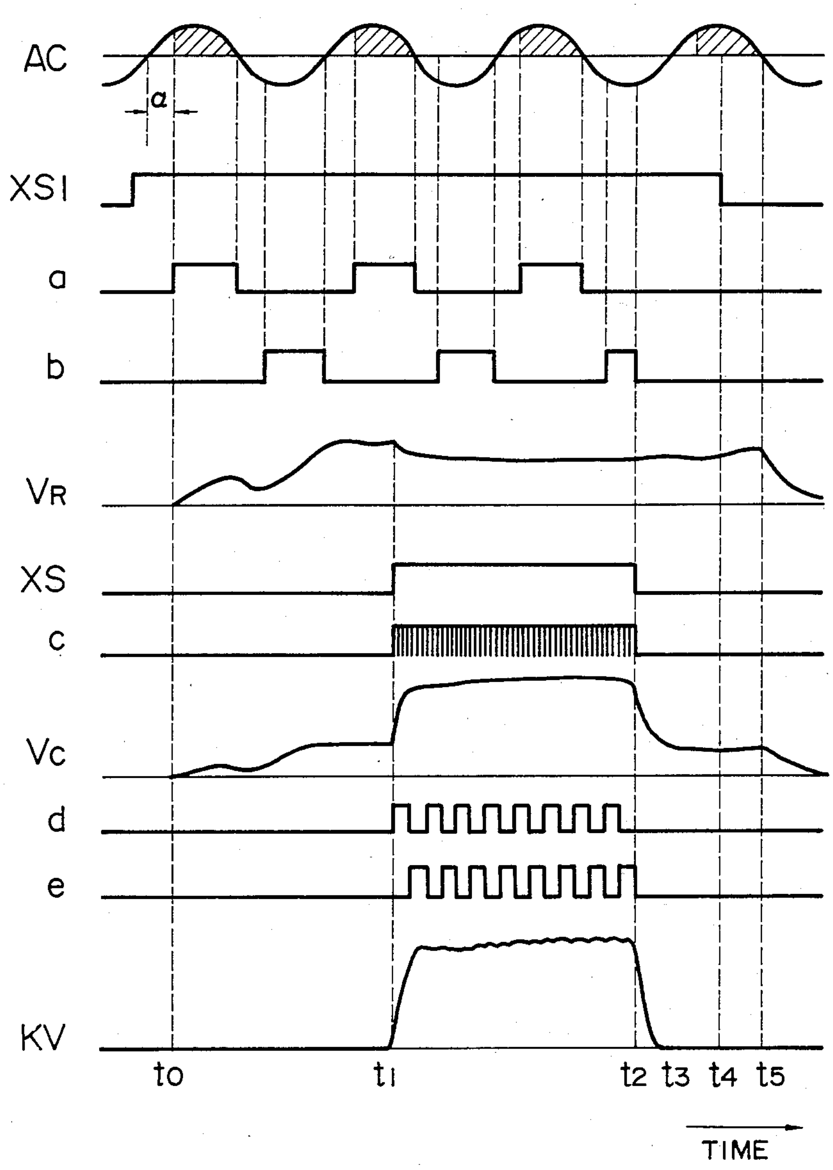
FIG. 2 is a waveform diagram for illustrating the operation of the first embodiment of the apparatus of the present invention.

FIG. 1 is a circuit diagram showing schematically the structure of the first embodiment of the inverter type X-ray apparatus in which the voltage boost-up DC-DC converter constructed on the basis of the principle described with reference to FIGS. 3 and 4 is incorporated, and FIG. 2 is a waveform diagram for illustrating the operation of the apparatus.

Referring to FIG. 1, the voltage boost-up DC-DC converter designated by the reference numeral 9 is composed of a reactor 9a, a transistor 9b, a diode 9c and a capacitor 9d. During the on-period of the transistor 9b, current supplied to the reactor 9a is stored as magnetic energy therein, and, during the off-period of the transistor 9b, the stored energy is supplied from the reactor 9a to the capacitor 9d and inverter 5 through the diode 9c, thereby providing an output voltage higher than an input voltage. A firing angle controller 10 generates a signal commanding the firing angle of the thyristors 1a to 1d on the basis of the settings of the tube voltage and tube current. The output signal of the firing angle controller 10 is applied to a gate circuit 11 which detects the phase of the commercial AC power source. The gate circuit 11 drives the thyristors 1a to 1d of the full-wave rectifier circuit 1 in response to the application of an exposure preparation signal prior to X-ray exposure. A duty ratio controller 12 determines the duty ratio of the transistor 9b on the basis of the settings of the tube voltage and tube current and generates an output signal indicative of the determined duty ratio. A first basis circuit 13 driving the transistor 9b under command of the output signal of the duty ratio controller 12 starts to drive the transistor 9b in response to an X-ray exposure signal applied thereto.

A second base circuit 14 drives the transistors 5a to 5d of the inverter 5 in response to the application of the X-ray exposure signal thereto. The smoothing capacitor 3 and capacitor 9d discharge through resistors 15 and 16 respectively.

FIG. 2 shows the waveforms of the commercial power supply voltage AC, exposure preparation signal $XS_1$, terminal voltage $V_R$ of the smoothing capacitor 3, X-ray exposure signal XS, terminal voltage of the capacitor 9d, tube voltage KV, signal a turning on the thyristors 1a and 1c, signal b turning on the thyristors 1b and 1d, signal c turning on the transistor 9b generating the stepped-up voltage, signal d turning on the transistors 5a and 5c of the inverter 5, and signal e turning on the transistors 5b and 5d of the inverter 5.

The operation of the first embodiment shown in FIG. 1 will be described with reference to FIG. 2.

Before the X-ray exposure is started, the settings of the tube voltage and tube current are applied to the firing angle controller 10 and duty ratio controller 12. The firing angle controller 10 and duty ratio controller 12 determine the firing angle of the full-wave rectifier circuit 1 and the duty ratio of the transistor 9b respectively, and their output signals indicative of the determined firing angle and determined duty ratio are applied to the gate circuit 11 and base circuit 13 respectively.

When the exposure preparation signal $XS_1$ is applied to the gate circuit 11 at time $t_0$, the gate circuit 11 generates the signals a and b to start to drive the full-wave rectifier circuit 1. Suppose that the firing angle at this time $t_0$ is $\alpha$. Then, the thyristors 1a to 1d are turned on during only the hatched period of the commercial power supply voltage AC in FIG. 2, thereby charging the smoothing capacitor 3. When the smoothing capacitor 3 has been completely charged, the voltage $V_R$ of the smoothing capacitor 3 is nearly equal to the peak value of the hatched period of the commercial power supply voltage AC. The average voltage $V_R\,a(\alpha)$ that can be supplied from the smoothing capacitor 3 under a loaded condition is expressed as follows:

$$V_R\,a(\alpha) = \frac{\sqrt{2}\,E}{\pi}(1 + \cos\alpha) \quad (7)$$

where E is the effective value of the commercial power supply voltage AC. Therefore, by controlling the firing angle $\alpha$, the terminal volta $V_R$ of the smoothing capacitor 3, that is, the input voltage of the DC-DC converter 9 can be controlled. In this state, the capacitor 9d is charged through the reactor 9a and diode 9c, and, therefore, the terminal voltage $V_C$ of the capacitor 9d is equal to the terminal voltage $V_R$ of the smoothing capacitor 3.

When the X-ray exposure signal XS is applied to the base circuits 13 and 14 at time $t_1$, the first base circuit 13 starts to drive the transistor 9b, and the second base circuit 14 starts to drive the transistors 5a to 5d. At time $t_1$, driving of the transistor 9b by the signal c, driving of the transistors 5a and 5d by the signal d, and driving of the transistors 5b and 5c by the signal e are started. As a result, the terminal voltage $V_C$ of the capacitor 9d exceeds the terminal voltage $V_R$ of the smoothing capacitor 3, and the inverter 5 inverts the boosted-up voltage $V_C$ of the capacitor 9d into an AC voltage having a predetermined frequency and applies this AC voltage to the high voltage transformer 6.

The voltage $V_C$ boosted up by the boost DC-DC converter 9 is expressed as follows, in which the internal resistance of the step-up DC-DC converter 9 is ignored:

$$V_C = \frac{1}{1 - D} V_R \quad (8)$$

where D is the duty ratio of the transistor 9b.

Thus, the boost DC-DC converter 9 operates with the optimum duty ratio so that an input voltage required to satisfy the tube voltage setting can be applied to the high voltage transformer 6. In the starting stage of X-ray exposure, however, a transient phenomenon tends to occur under influence of a leakage inductance of the high voltage transformer 6 and an electrostatic capacitance of a cable connecting the full-wave rectifier circuit 7 to the X-ray tube 8. In the starting stage of X-ray exposure, therefore, it is necessary to control the duty ratio D by the duty ratio controller 12 so that the pre-set voltage can be applied to the X-ray tube 8 in spite of such a transient phenomenon.

The DC voltage inverted into the AC voltage by the inverter 5 is transformed up by the high voltage transformer 6, and the output voltage of the high voltage transformer 6 is full-wave rectified in the full-wave rectifier circuit 7 to be turned into a DC voltage again, and this DC voltage is applied to the X-ray tube 8.

When the application of the X-ray exposure signal XS is ceased at time $t_2$ to terminate the X-ray exposure, the base circuits 13 and 14 cease generation of the signals c, d and e. The boost-up DC-DC converter 9 and inverter 5 cease to operate, and the X-ray exposure is terminated at time $t_3$ where the charges of the electrostatic capacitanceof the cable connecting the full-wave rectifier circuit 7 to the X-ray tube 8 have been completely discharged.

When the exposure preparation signal XS1 disappears at time $t_4$, the gate circuit 11 ceases to drive the full-wave rectifier circuit 1. However, the thyristors 1a to 1*d* cannot be turned off until time $t_5$ is reached where the phase of the power supply voltage AC is inverted. Until time $t_5$ is reached, the smoothing capacitor 3 is charged to the same voltage level as that charged before the X-ray exposure is started. The capacitor 9*d* discharges through the discharge resistor 16 until its voltage becomes equal to that of the smoothing capacitor 3. The full-wave rectifier circuit 1 is turned off at time $t_5$, and charging of the smoothing capacitor 3 ceases at the same time. Thereafter, both the capacitors 3 and 9*d* discharge through the discharge resistors 15 and 16 respectively to be restored to their original state.

It will be seen from the above description that, in the first embodiment employing the step-up DC-DC converter 9, an input voltage higher than an input voltage of the DC-DC converter 9 can be applied to the inverter 5, and the winding ratio of the high voltage transformer 6 can be reduced. Therefore, the current capacity of the semiconductor switching elements of the inverter 5 can be reduced, and the power loss due to the resistance of the wiring of the inverter 5 and the primary winding of the high voltage transformer 6 can also be reduced.

Suppose, for example, that an input voltage of 180 [V] given by the expression (2) is applied to the boost-up DC-DC converter 9, and the duty ratio D is 0.7. Then, from the expression (8), the output voltage $V_R$ of the DC-DC converter 9 is calculated as follows:

$$V_R = 180 \times \frac{1}{1-0.7} = 600\ [\mathrm{V}] \quad (10)$$

Then, in order to supply a tube voltage of 150 [kV] to the X-ray tube 8, the winding ratio K of the high voltage transformer 6 is calculated as follows:

$$K = \frac{150 \times 10^3}{600} = 250 \quad (11)$$

When the setting of the tube current is 1000 [mA], the input current $I_{T1}$ of the high voltage transformer 6 is calculated as follows:

$$I_{T1} = 1000\ [\mathrm{mA}] \times K = 250\ [\mathrm{A}] \quad (12)$$

Thus, the current controllability required for the switching elements of the inverter 5 is reduced to a value which is as small as 250 [A]. This value is only about ¼ of the prior art value given by the expression (5). The power loss Wl due to the wiring resistance Rl, given by the expression (6), can also be decreased to about 1/16 of the prior art value.

Figure 8:
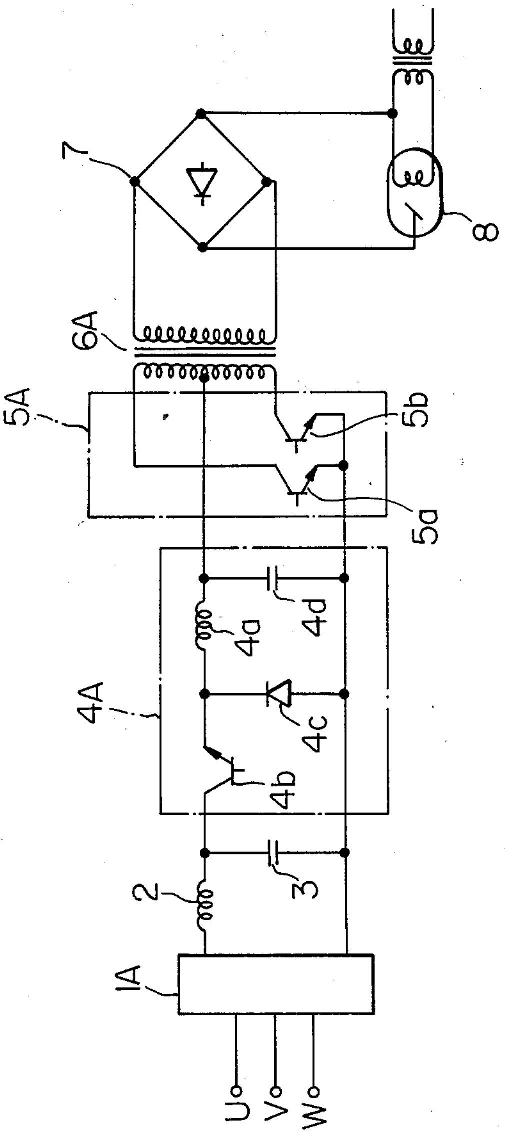
FIG. 8. PRIOR ART
FIG. 8 is a circuit diagram showing schematically the structure of a prior art, inverter type X-ray apparatus to point out problems inherent in the prior art apparatus.

The current capacity of the switching elements of the DC-DC converter 9 shown in FIG. 1 can be considered to be substantially equal to that of the switching elements of the chopper 4 shown in FIG. 8. This is because the voltage of the capacitor 3 connected to the output of the full-wave rectifier circuit 1 for supplying the input power to the DC-DC converter 9 shown in FIG. 1 is substantially equal to that of the capacitor 3 connected to the output of the full-wave rectifier circuit 1 for supplying the input power to the chopper 4 shown in FIG. 8, and, therefore, the currents for providing equivalent power in the former and latter are substantially equal to each other.

When it is desired to apply an input voltage lower than the commercial power supply voltage to the inverter 5, this is achieved by suitably controlling the operating phase of the full-wave rectifier circuit 1. By so controlling the full-wave rectifier circuit 1, the output voltage of the full-wave rectifier circuit 1, the input voltage of the DC-DC converter 9 can be lowered. Thus, the controllable range of the tube voltage can be widened.

In a second embodiment of the present invention, which is a modification of the first embodiment shown in FIG. 1, feedback control means are provided so as to improve the stability and accuracy of the output voltage of the boost-up DC-DC converter 9.

Figure 5:
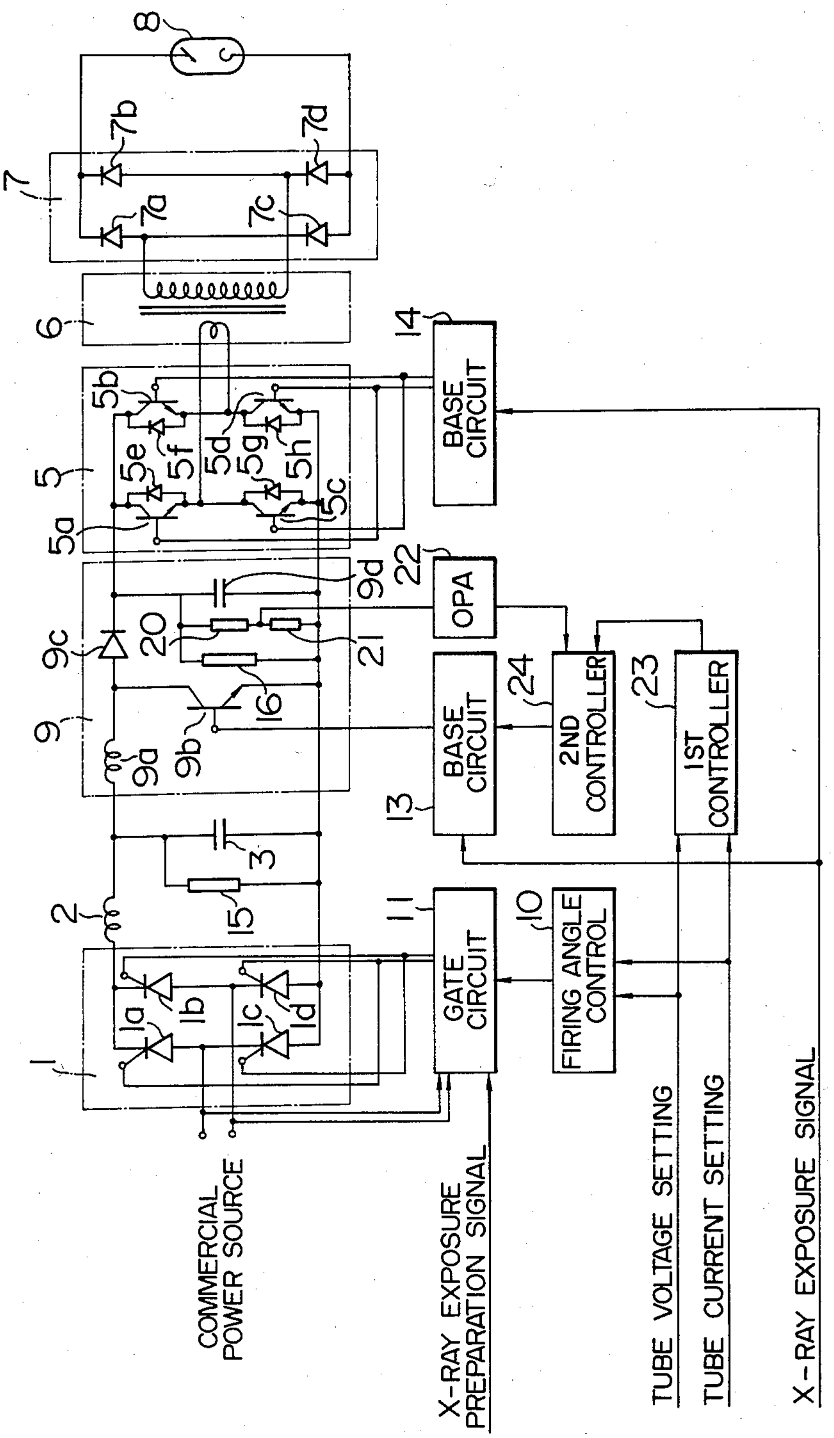
FIG. 5 is a circuit diagram showing schematically the structure of a second embodiment of the inverter type X-ray apparatus of the present invention.

FIG. 5 is a circuit diagram showing schematically the structure of the second embodiment of the inverter type X-ray apparatus of the present invention.

Referring to FIG. 5, voltage dividers 20 and 21 are provided to divide the output voltage of the boostup DC-DC converter 9 so as to detect the output voltage of the DC-DC converter 9. An operational amplifier 22 converts the voltage detected by the voltage dividers 20 and 21 into a voltage required for controlling the converter output voltage. A first controller 23 generates an output signal for determining the output voltage of the DC-DC converter 9 on the basis of the tube voltage setting and tube current setting. A second controller 24 applies, to the base circuit 13, a signal indicative of the optimum duty ratio of the transistor 9*b* so that the difference between the output signal of the operational amplifier 22 and that of the first controller 23 can be reduced to zero.

The operation of the second embodiment of the inverter type X-ray apparatus is generally similar to that of the first embodiment.

The second embodiment shown in FIG. 5 differs from the first embodiment shown in FIG. 1 in that the detected output voltage of the DC-DC converter 9 is fed back through the operational amplifier 22 and compared in the second controller 24 with the setting applied from the first controller 23, thereby stabilizing the output voltage of the DC-DC converter 9.

Describing more concretely, the duty ratio of the transistor 9*b* in FIG. 1 is determined on the basis of the tube voltage setting and tube current setting and maintained constant. In contrast, in the second embodiment shown in FIG. 5, the first controller 23 determines the required output voltage $V_{set}$ of the DC-DC converter 9 on the basis of the tube voltage setting and tube current setting. The second controller 24 acts to change the duty ratio of the transistor 9*b* so that the actual output voltage of the DC-DC converter 9 equals the required output voltage $V_{set}$ determined by the first controller 23. As a result, regardless of possible turbulence such as a variation of the commercial power supply voltage, the output voltage of the DC-DC converter 9 can be stabilized to provide a stable tube voltage waveform.

In the second embodiment shown in FIG. 5, the output voltage of the DC-DC converter 9 is detected and fed back for the purpose of voltage control, by way of example. It is apparent, however, that the accuracy of the tube voltage applied to the X-ray tube 8 can be further improved when the tube voltage of the X-ray tube 8 is directly detected and used for the feedback control.

It will be seen from the above description of the second embodiment that the accuracy and stability of the tube voltage can be improved by the feedback control.

Figure 6:
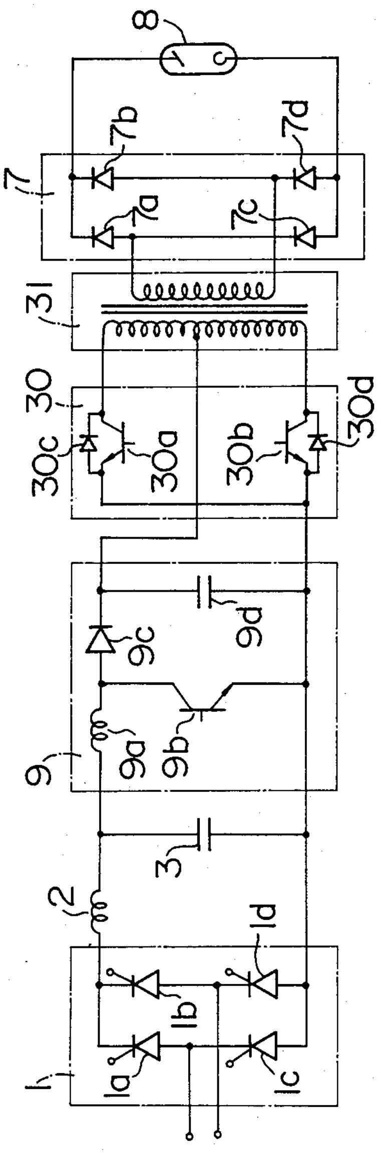
FIG. 6 is a circuit diagram showing schematically the structure of a third embodiment of the inverter type X-ray apparatus of the present invention.

FIG. 6 is a circuit diagram showing schematically the structure of a third embodiment of the inverter type X-ray apparatus of the present invention. In this third embodiment which is a modification of the first embodiment, a push-pull inverter 30 is employed to replace the full-bridge inverter 5.

Referring to FIG. 6, the push-pull inverter 30 is composed of transistors 30*a*, 30*b* and free-wheel diodes 30*c*, 30*d*. The transistors 30*a* and 30*b* are alternately turned on-off at a predetermined frequency. A high voltage transformer 31 has a center tap in its primary winding.

When the transistors 30*a* and 30*b* are alternately turned on-off, the polarity of the inverter output voltage applied across the primary winding of the high voltage transformer 31 changes alternately, and an AC voltage is induced across the secondary winding of the high voltage transformer 31.

The operation of the third embodiment including the modified inverter 30 is generally similar to that of the first embodiment shown in and described with reference to FIGS. 1 and 2.

The push-pull inverter 30 employed in the third embodiment requires only two switching elements. Therefore, the number of the switching elements is reduced to ½ of that of the switching elements of the full-bridge inverter 5.

Figure 7:
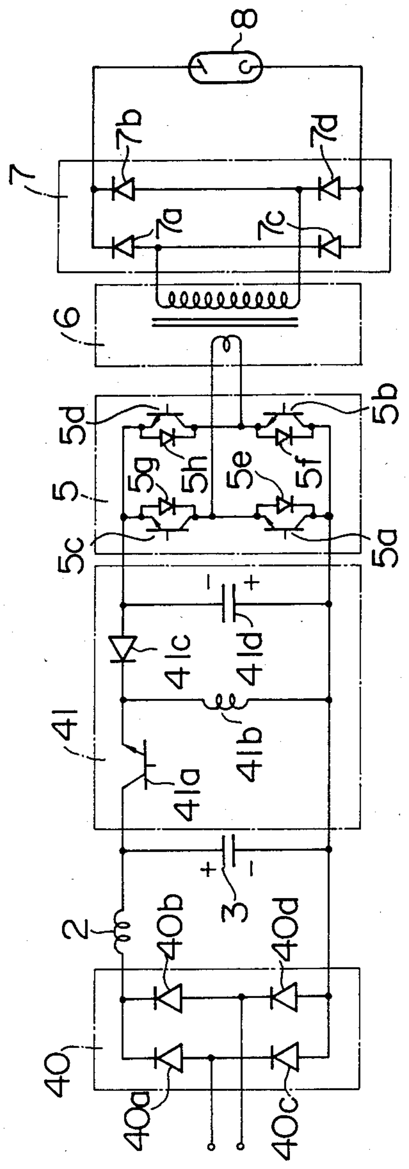
FIG. 7 is a circuit diagram showing schematically the structure of a fourth embodiment of the inverter type X-ray apparatus of the present invention.

FIG. 7 is a circuit diagram showing schematically the structure of a fourth embodiment of the inverter type X-ray apparatus of the present invention. This fourth embodiment is also a modification of the first embodiment.

Referring to FIG. 7, a full-wave rectifier circuit 40 is composed of diodes 40*a* to 40*d*. A buck boost DC-DC converter 41 is composed of a transistor 41*a*, a reactor 41*b*, a diode 41*c* and a capacitor 41*d*.

In the buck boost DC-DC converter 41, current supplied to the reactor 41*b* during the on-period of the transistor 41*a* is stored as magnetic energy in the reactor 41*b*. When the transistor 41*a* is then turned off, current from the reactor 41*b* flows through a path which is traced from the reactor 41*b*→capacitor 41*d* and inverter 5→diode 41*c* to the reactor 41*b* to supply the energy to the capacitor 41*d*. Therefore, the capacitor 41*d* has a polarity opposite to that of the smoothing capacitor 3, as shown. The output voltage Vc of this buck boost DC-DC converter 41 is given by the following expression:

$$V_C = \frac{D}{I - D} V_R \quad (9)$$

Where $V_R$ is an input voltage, and D is the duty ratio of the transistor 41*a*.

It will be apparent from the expression (9) that, in this fourth embodiment, the output voltage of the DC-DC converter 41 can not only be stepped up but also be stepped down relative to the input voltage.

Such a buck boost DC-DC converter 41, capable of generating an output voltage, lower than an input voltage is required for the reason which will be described now. Generally, the output voltage of the X-ray apparatus ranges from 20 [kV] to 150 [kV]. This means that the ratio between the maximum output voltage and the minimum output voltage is 7.5.

Therefore, the input voltage of the inverter 5 must also be changeable between a minimum and a maximum which is at least 7.5 times. The allowable input voltage of the inverter 5 is limited by the withstand voltage characteristic of semiconductor elements employed. Since the maximum value of voltage for which ordinary semiconductor elements can withstand is 1000 [V] to 1200 [V], the practical upper limit of the inverter input voltage is approximately 800 [V]. Suppose that an inverter input voltage of 800 [V] is required to provide a tube voltage of 150 [kV]. Then, an inverter input voltage of about 107 [V] is required to provide a tube voltage of 20 [kV]. When the X-ray apparatus is connected to a commercial AC power source of, for example, single-phase 200 [V], an input voltage of 180 [V], given by the expression (2), is applied to the DC-DC converter 41. Therefore, a function capable of generating an output voltage lower than an input voltage is required for the DC-DC converter 41.

In the first embodiment shown in FIG. 1, the DC-DC converter 9 itself is not capable of generating an output voltage lower than an input voltage. However, no practical problem arises since the input voltage of the DC-DC converter 9 can be lowered by controlling the operating phase of the thyristors of the rectifier circuit according to the expression (7).

While some preferred embodiments of the present invention have been described by way of example, it is apparent that the present invention is in no way limited to such specific embodiments. For example, all the transistors employed in the embodiments may be replaced by semiconductor switching elements such as gate turn-off thyristors (GTO). Further, the inverter type is in no way limited to the full-bridge type or push-pull type and may be the half-bridge type or the like. Further, the commercial AC power source is not limited to that of single-phase and may be that of three-phase. In such a case, the number of semiconductor elements of the rectifier circuit connected to the output of the commercial AC power source may be increased to provide a three-phase full-wave rectifier.

It will be understood from the foregoing detailed description of the present invention that an input voltage of an inverter in an inverter type X-ray apparatus can be made higher than an input voltage of a DC-DC converter, so that the winding ratio of a high voltage transformer can be reduced.

As a result, an input current of smaller value supplied to the primary winding of the high voltage transformer can produce an output current of predetermined value in the secondary winding of the high voltage transformer. Thus, the current capacity of the switching elements of the inverter can be reduced, and the power loss due to the resistance of the wiring of the inverter and of the primary winding of the high voltage transformer can be reduced.

We claim:

1. An inverter type X-ray apparatus comprising:

rectifying means for converting an AC power signal from an AC power source into an input DC voltage, a DC-DC converter for converting said input DC voltage into an output DC voltage different from said input DC voltage, said DC-DC converter including voltage control means for controlling said DC-DC converter such that said output DC voltage is higher than said input DC voltage, an inverter means for inverting said output DC voltage of said DC-DC converter into an AC voltage, rectifying control means for controlling said rectifying means such that said input DC voltage of said DC-DC converter is increased or decreased based on an output of said rectifying control means, a high voltage transformer for transforming an output voltage of said inverter into a higher voltage, a rectifier circuit means for converting an output voltage of said high voltage transformer into an DC voltage, and an X-ray tube to which an output voltage of said rectifier circuit means is applied.

2. An inverter type X-ray apparatus comprising:

rectifying means for converting an AC power signal from an AC power source into an input DC voltage, a DC-DC converter for converting said input DC voltage into an output DC voltage different from said input DC voltage, said DC-DC converter including voltage control means for controlling said DC-DC converter such that said output voltage is one of higher and lower than said input DC voltage, an inverter means for inverting said output DC voltage of said DC-DC converter into an AC voltage, rectifying control means for controlling said rectifying means such that said input DC voltage of said DC-DC converter is increased or decreased based on an output of said rectifying control means, a high voltage transformer for transforming an output voltage of said inverter into a higher voltage, a rectifier circuit means for converting an output voltage of said high voltage transformer into a DC voltage, an X-ray tube to which an output voltage of said rectifier circuit means is applied.

3. An inverter type X-ray apparatus as claimed in claim 1, wherein said voltage control means includes a reactor, a switching element, a diode and a capacitor which are interconnected such that, during an on-period of said switching element, current is supplied to said reactor, while during an off-period of said switching element, current is supplied from said reactor to said capacitor.

4. An inverter type X-ray apparatus as claimed in claim 2, wherein said voltage control means includes a reactor, a switching element, a diode and a capacitor which are interconnected such that, during an on-period of said switching element, current is supplied to said reactor, while during an off-period of said switching element, current is supplied from said reactor to said capacitor.

5. An inverter type X-ray apparatus as claimed in claim 1, further comprising:

feedback control means connected to said DC-DC converter for stabilizing said output DC voltage of said DC-DC converter.

6. An inverter type X-ray apparatus as claimed in claim 2, further comprising:

feedback control means connected to said DC-DC converter for stabilizing said output DC voltage of said DC-DC converter.

7. An inverter type X-ray apparatus as claimed in claim 1, wherein said inverter comprises a full-bridge inverter.

8. An inverter type X-ray apparatus as claimed in claim 2, wherein said inverter comprises a full-bridge inverter.

9. An inverter type X-ray apparatus as claimed in claim 1, wherein said inverter comprises a push-pull inverter.

10. An inverter type X-ray apparatus as claimed in claim 2, wherein said inverter comprises a push-pull inverter.

11. An inverter type X-ray apparatus as claimed in claim 1, wherein said inverter comprises a half-bridge inverter.

12. An inverter type X-ray apparatus as claimed in claim 2, wherein said inverter comprises a half-bridge inverter.

13. An inverter type X-ray apparatus as claimed in claim 1, wherein said rectifying means includes a smoothing circuit for smoothing said input DC voltage.

14. An inverter type X-ray apparatus as claimed in claim 2, wherein said rectifying means includes a smoothing circuit for smoothing said input DC voltage.

15. An inverter type X-ray apparatus according to claim 1, wherein said rectifying control means includes means for controlling the firing angle $\alpha$ of said rectifying means.

16. An inverter type X-ray apparatus according to claim 2, wherein said rectifying control means controls the firing angle $\alpha$ of said rectifying means.

* * * * *